United States Patent [19]
Brinkmann et al.

[11] Patent Number: 6,123,459
[45] Date of Patent: Sep. 26, 2000

[54] LINEAR GUIDE WITH ROLLING BODIES

[75] Inventors: Hans Brinkmann, Gottingen; Walter Geis, Aalen, both of Germany

[73] Assignee: Carl-Zeiss-Stiftung, Germany

[21] Appl. No.: 08/999,780

[22] Filed: Oct. 31, 1996

[51] Int. Cl.[7] .................................................. F16C 29/04
[52] U.S. Cl. .................................................. 384/47; 384/55
[58] Field of Search .................................. 384/57, 55, 53, 384/50, 48, 47

[56] References Cited

U.S. PATENT DOCUMENTS

| | | | |
|---|---|---|---|
| 3,897,119 | 7/1975 | McMurtrie | 384/55 |
| 4,923,311 | 5/1990 | Gibbs | 384/49 |
| 5,374,128 | 12/1994 | Herbeck | 384/49 |

FOREIGN PATENT DOCUMENTS 805794  10/1958  United Kingdom .

Primary Examiner—Lenard A. Footland

[57] ABSTRACT

A linear guide includes rolling bodies that are inserted into mutually corresponding grooves of mutually guided parts. The guide surfaces for the rolling bodies are partially formed by plane surfaces of rotatable beveled round rods that are positioned in the grooves. The linear guide is constructed as a double guide on both sides with respectively two spaced-apart guide grooves on mutually opposed sides of the mutually guided parts. Because the guide surfaces are partially formed by the plane surfaces of the rotatable beveled round rods, wedge angles between the mutually guided parts are compensated. Manufacturing technical requirements regarding the matching of the distances of the guide grooves to each other are thereby greatly reduced.

20 Claims, 4 Drawing Sheets

LINEAR GUIDE WITH ROLLING BODIES

BACKGROUND OF THE INVENTION

1. Field of the Invention

The invention relates to a linear guide for moving parts and more particularly to a linear guide for moving parts on microscopes.

2. Discussion of Prior Art

A linear guide for moving parts on microscopes is described in German Utility Model 77 31 160. It has double guides on both sides, that is, the guided part is guided on two opposite sides respectively on two spaced-apart guide tracks. In order to adjust the play or the smooth running property of the guide, guiding takes place respectively only in one direction on two mutually opposite sides, while the guiding on the two other mutually opposite sides takes place in two substantially perpendicular directions. Such double guides on both sides have, in comparison with linear guides with only one guide track on each side, substantially smaller tilting moments and hence a greater rigidity.

A double guide on both sides is of course over determined by the two substantially V-shaped guide tracks on the one side and the two flat guide tracks on the other side; that is, wedge angles between the guided part and the guiding part cannot be compensated. Therefore only a very small guide play can be compensated, without leading to tight running. Thus for smooth running, high requirements are placed on the precision of the guide tracks, and also with respect to their parallelism, and with respect to their spacings.

The situation is similar for the guide according to British Patent 1,012,974, in which the guided part has three parallel round rods which are guided respectively between two rollers on the guided part.

SUMMARY OF THE INVENTION

It is therefore the object of the invention to provide a guide in which the manufacturing tolerances to be adhered to as regards the spacings of the guide tracks are distinctly less than those according to the state of the art.

This object is attained by a linear guide having at least two mutually guided parts with mutually corresponding guide grooves and guide surfaces. Some of the guide surfaces are plane surfaces of rotatable beveled round rods located in the mutually corresponding guide grooves.

In the linear guide according to the invention, some of the guide surfaces is formed by round rods which are beveled with plane faces and are rotatably inserted in the mutually guided portions. The beveled round rods lie, in this case, with their round surface on the surfaces of the guide grooves and can rotate in their seating for the compensation of wedge angles, whereby a wedge angle is compensated which arises from spacings of the guide grooves which are not exactly matched. Rolling bodies, either in the form of rollers or in the form of balls, can be inserted in the linear guides formed by mutually corresponding guide grooves and the beveled round rods which are rotatably inserted into the grooves.

For the insertion of both the rolling bodies and also the beveled round rods, the grooves of one of the two mutually guided parts have a substantially rectangular cross section perpendicular to the guide direction, and the grooves of the other guided part have a substantially V-shaped cross section perpendicular to the guide direction. The beveled round rods are then inserted in the corners of the rectangular grooves. For each guide track there thereby result two respective guide surfaces on each of the two mutually guided parts, and in fact two guide surfaces which form a V-shape with respect to each other on the one part, from the V-shaped groove, and two guide surfaces which likewise substantially form a V-shape with respect to each other, from the flat faces of the beveled round rods. The latter guide surfaces can then be aligned as required for the compensation of wedge angles, in that the round rods align themselves relative to the rectangular guide groove.

Alternatively, the grooves in the two mutually guided parts can respectively have a rectangular cross section perpendicular to the guide direction. A beveled round rod is then inserted in the respective two corners of two mutually opposite grooves, thus in the total of four corners.

In a particularly advantageous preferred embodiment of the invention, the linear guide is constructed as a double guide on both sides. For this purpose, the linear guide can be constructed as a sandwich of two outer portions, which are connected together, and a middle portion which is guided relative to the two outer portions. Furthermore, the middle portion has, on mutually opposite sides, two respective guide grooves which are parallel to each other, and the outer portions have, respectively on the side facing the middle portion, two parallel grooves which correspond in their spacing to the grooves of the middle portion. Either the grooves of the middle portion or of the outer portions then have a rectangular cross section perpendicular to the guide direction, and two round rods are inserted in two of the mutually opposite rectangular grooves, and only one round bar is inserted in the two remaining rectangular grooves. As rolling bodies, either balls, or rollers inserted crosswise, are inserted in the two resulting guide grooves with two respective beveled round rods. In the two remaining guide grooves with only one round rod, however, when rollers are used, these are inserted in respectively the like direction. The grooves with only one beveled round rod are then provided on the same side in relation to the outer two rectangular grooves, and the guide surfaces of both guide tracks on this side stand substantially perpendicular to each other.

In an alternative preferred embodiment of a double guide, all the grooves are formed with a rectangular cross section perpendicular to the guide direction. On one side, beveled round rods are then inserted both in the corners of the grooves of both outer portions and of the middle portion. In the resulting guide grooves with respectively four round rods, balls or crosswise inserted rollers are then inserted as rolling bodies. In the two other guide grooves, rollers are inserted, always in the same direction.

The two outer portions can be screwed together with screws which pass through slotted holes in the middle portion. During this screw connection, the round rods inserted into the guide grooves align themselves such that wedge angles between either of the outer plates and the middle plate are compensated. In this manner, there results a very rigid double guide on both sides with a simple construction and relatively small requirements on the manufacturing tolerances to be maintained. Moreover, disadvantageous distortions of the mutually guided portions are avoided.

The linear guide according to the invention is particularly suitable in microscopes for receiving the stage which is movable relative to the microscope stand, in particular when the linear guide is constructed as a double guide on both sides, since no, or extremely small, tilting moments are transmitted to the stage, because of the high rigidity of the guide.

The linear guide is used with particular advantage in combination with a belt drive for the transmission of a rotary motion of a drive motor to the linear motion of the stage. Because such a belt drive has only a very small reversal backlash, and the double guide on both sides ensures, for its part, an extremely precise and smooth-running guide, the motion of the drive motor can be transmitted, nearly without reversal backlash and without tilting motions arising, to the motion of the stage. In order to protect such a belt drive against damage due to overloading, a rack and pinion system can additionally be guided synchronously with the belt drive. A further advantageous combination results from the provision of a harmonic drive gearing between the electric motor for driving the belt drive and the drive roller of the belt drive. Since harmonic drives are distinguished by a minimum number of moving parts, this kind of gear itself also has a minimum degree of reversal backlash, so that the transmission of motion from the drive motor as far as the stage can take place with little reversal backlash and high precision. Such a combination is particularly suitable for microscopes whose motor control permits an automatic repositioning of the stage in a previously stored position, or an automatic refocusing after a change of objective.

BRIEF DESCRIPTION OF THE DRAWINGS

Details of the invention are explained herein below in further detail, with reference to the preferred embodiments shown in the accompanying drawings, in which.

DETAILED DESCRIPTION OF THE PREFERRED EMBODIMENTS

Figure 1:
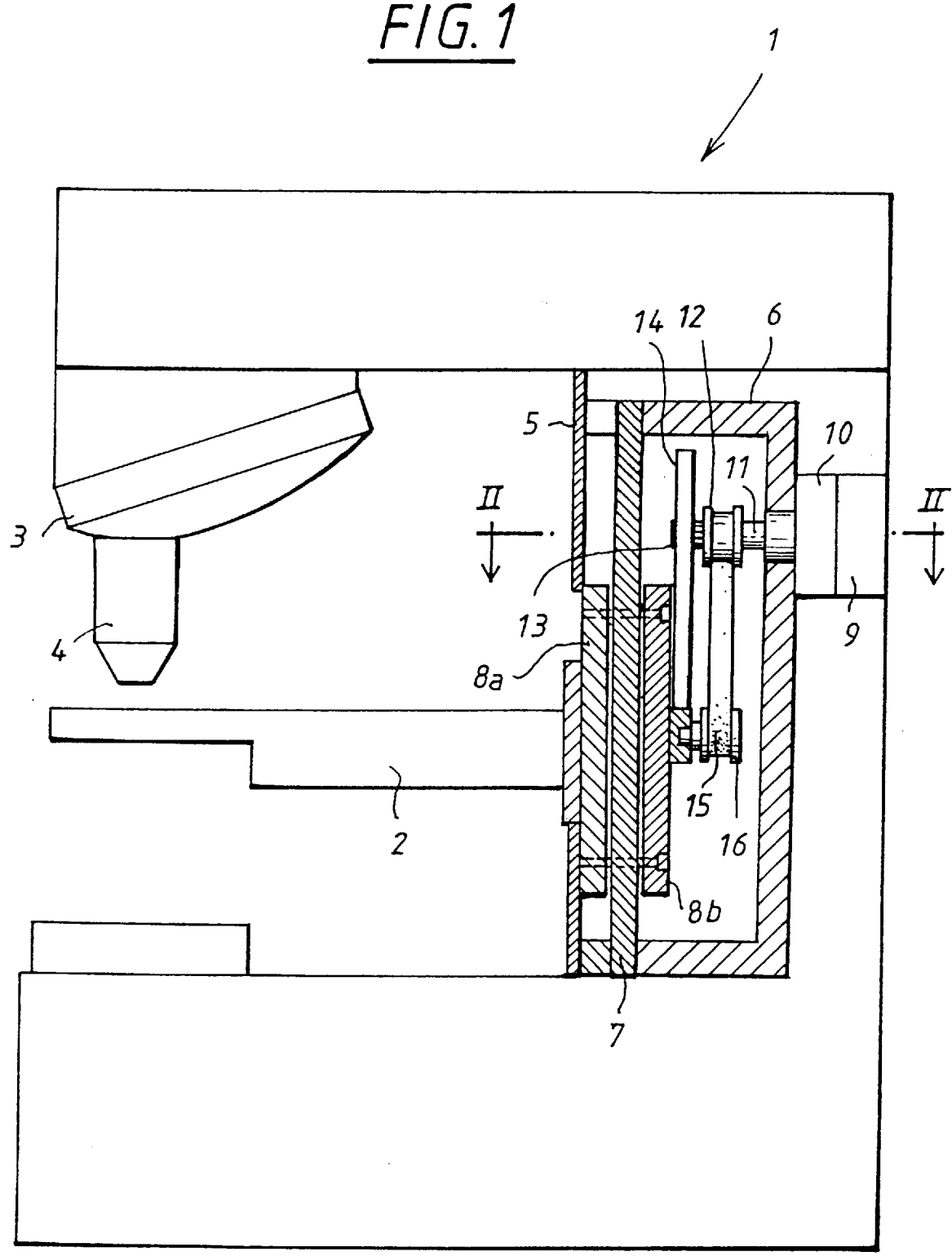
FIG. 1 shows a vertical section through the lower portion of a microscope with a linear guide according to the invention for the stage.

The lower portion of the microscope stand is denoted by (1) in FIG. 1. The stage (2) is received on a vertical column (5) of the microscope stand (1), on a drive module (6) within the vertical column (5). By means of the drive module (6), the stage (2) is displaceable for focusing, in a vertical direction relative to the objective (4) received in a revolving nosepiece (3).

For the precise guiding of the stage (2) in the vertical direction, the focusing module (6) has double linear guides on both sides, with a fixed guide plate (7) and two plates (8a, 8b) which are guided in a vertical direction. The stage (2) is connected to the guided plates (8a, 8b).

An electric motor (9) is provided to produce the focusing motions, and can be controlled by a motor control (not shown in the drawing) such that the shaft of the electric motor (9) executes angular motions through an angle of rotation which is defined by the motor control. For this purpose, the electric motor (9) has an angle encoder. Since such motors and the associated motor controls are well known, there is no need to go further into the details of them here.

The rotary motion of the electric motor (9) is geared down by a subsequent harmonic drive gearing. This harmonic drive gearing has the known structure of an elliptical steel disc with a central hub, and an attached, elliptically deformable thin ring ball bearing which is coupled to the shaft of the motor (9); a rigid cylindrical ring with inner toothing as the outer component; and, between the elliptical steel disc and the cylindrical ring, a cylindrical steel bushing with outer toothing. On a rotary motion of the elliptical steel disc, the cylindrical steel bushing, whose outer toothing is in engagement with the inner toothing of the cylindrical ring in the direction of the major axis of the ellipse, is deformed by means of the elliptically deformable ball bearing. The major elliptical axis of the cylindrical steel bushing is displaced by means of this deformation. Since the cylindrical steel bushing has two fewer teeth than the cylindrical ring, there results a relative motion between the cylindrical steel bushing and the cylindrical ring to the extent of two teeth after one revolution of the elliptical steel disc. The cylindrical steel bushing therefore executes a strongly geared down motion and serves as the driven element of the gearing.

A drive roller (12) for the belt drive and a pinion (13) are arranged coaxially of each other on the driven shaft (11) of the harmonic drive gearing (10); the diameter of the pinion (13) amounts to half of the diameter of the drive roller (12). The pinion is in engagement, with play, with a rack (14), which is, fastened to the guided plate (8b) of the linear guide.

In the lower region of the rack (14), a further roller (16) is rotatably fastened to the guided plate (8b) of the linear guide by means of a ball bearing, which is not shown in detail. This roller (16) is suspended on the linear guide, as can be gathered from FIG. 4, in a U-shaped loop of a flat steel band (15), which is attached to the drive roller (12). The second end of the steel band (15) is attached at about the same height as the drive roller (12) to a fixed shaft (17) on the focusing module (6).

The belt drive, consisting of the fixed shaft (17), the rotatable roller (12) on the stationary part, and the likewise rotatable roller (16) on the moving part, operates according to the principle of a loose roller. Upon one rotation of the drive roller (12) in the clockwise direction, the loose roller (16) is lifted by a distance which corresponds to half of the peripheral motion of the drive roller (12). Since the diameter of the pinion is half the diameter of the drive roller (12), the system of rack (14) and pinion (13) is moved, neglecting the thickness of the drive band (15), synchronously with the motion of the belt drive and thus of the driven part (8b). The preset play between the teeth of the pinion (13) and the teeth of the rack (14) hence is maintained during the motion. A loading of the system of rack and pinion only arises when the stage (2) (FIG. 1) is loaded more strongly than permissible and the band (15) is thereby correspondingly strongly extended. The precision of the transmission of motion, particularly with regard to freedom from play and to reversal backlash, is thus determined simply and solely by the belt drive. The rack (14) and pinion (13) system serves solely to protect the belt drive when excessive loading occurs. It is of definitive importance here that the precision of the tooth elements, in particular their surface quality, does not decisively participate in the positioning, and that at the same time a long life of the drive is ensured by the protection of the belt drive.

Figure 4:
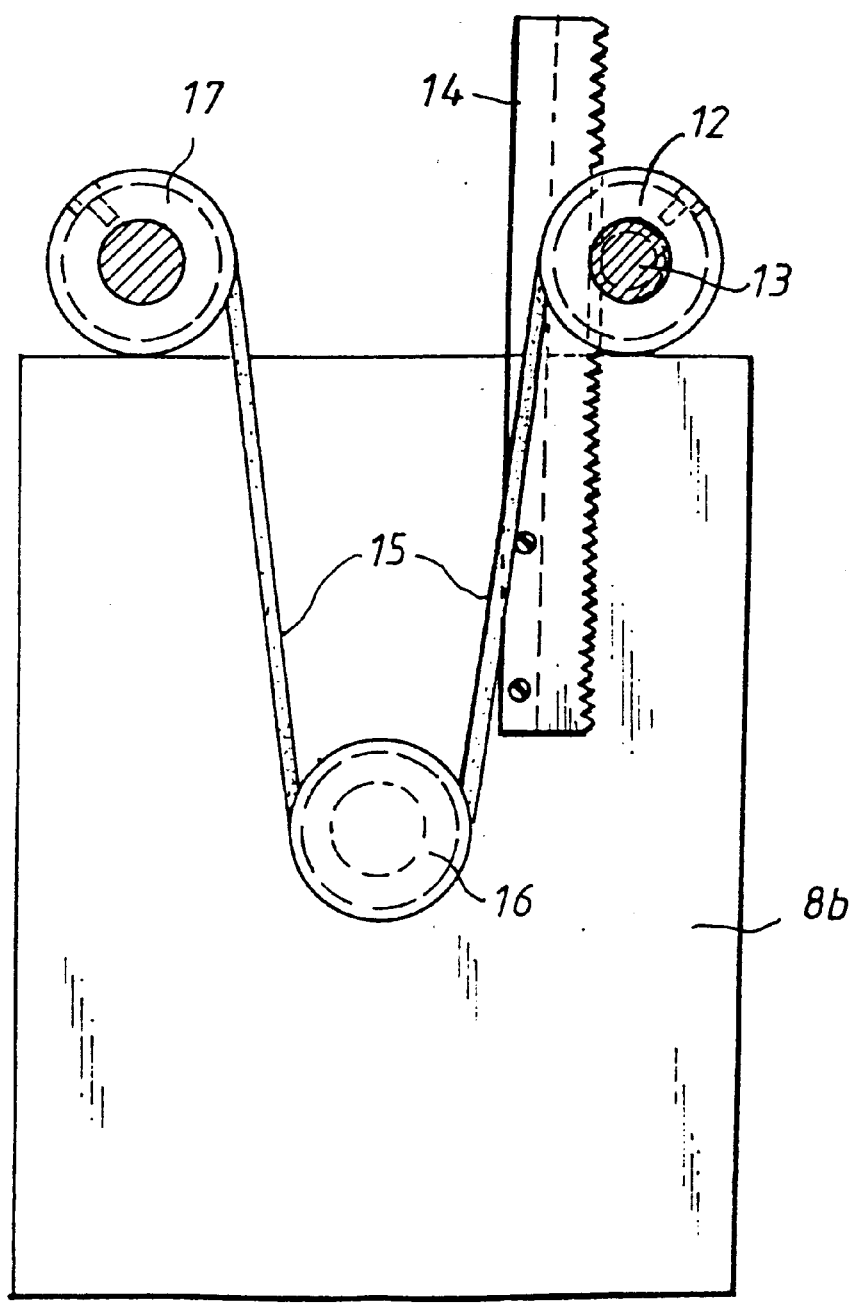
FIG. 4 shows a vertical section along the line IV—IV in FIG. 2.

In the embodiment shown in FIGS. 1 and 4, the belt drive is pretensioned exclusively by the weight of the stage (2) and of the linear guide. If the weight of the stage (2) is not sufficient for the tensioning of the belt drive, a tensioning spring can be additionally provided, which pulls or presses the moving parts of the linear guide (8a, 8b) against the tension direction of the band (15).

Figure 2:
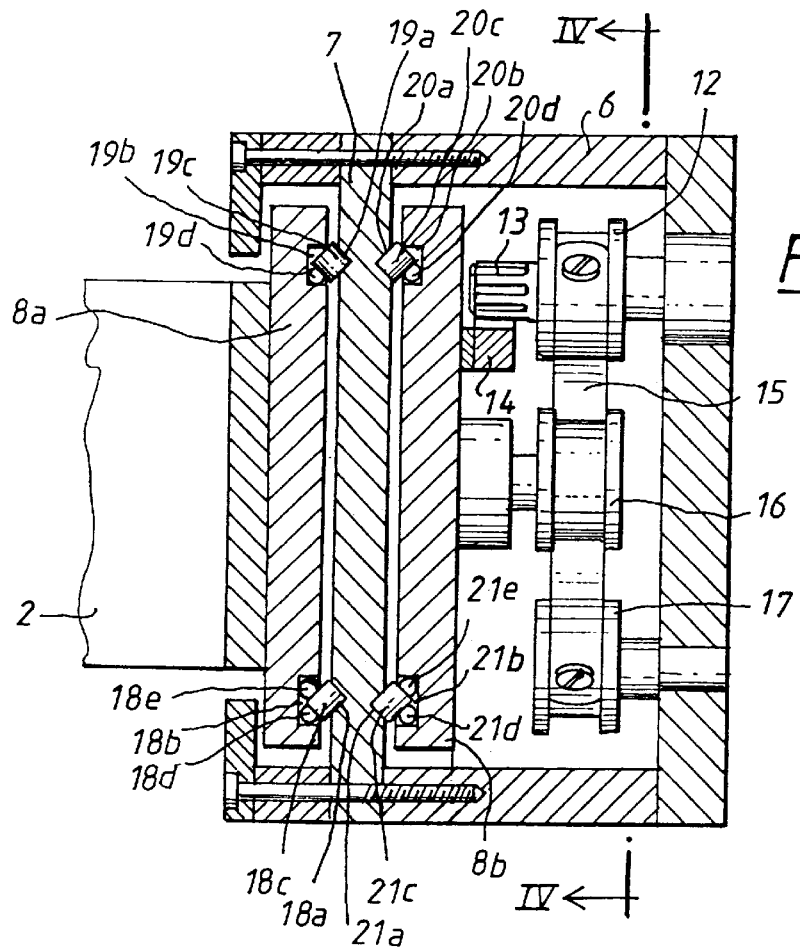
FIG. 2 shows an enlarged illustration of the linear guide of FIG. 1, in a horizontal section along the line II—II in FIG. 1.
Figure 3:
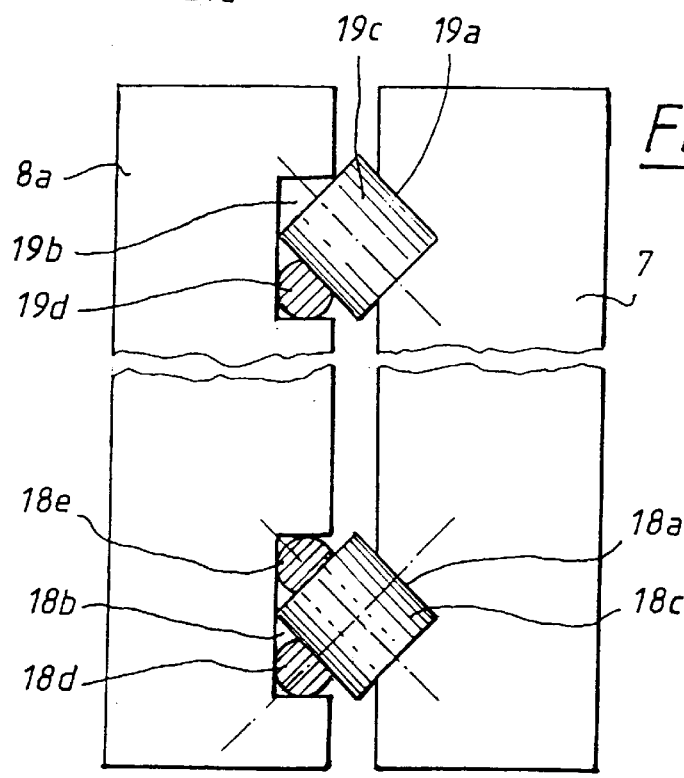
FIG. 3 shows a section, further enlarged, of the linear guide in FIG. 2.

Enlarged details of the linear guide are shown in the sectional views of FIGS. 2 and 3. The linear guide is a sandwich construction of three plates (8a, 7, 8b). In it, the middle plate (7) is screwed to the frame of the focusing module (6). The stage (2) is received on the outer plate (8a) on the stage side, and the rack (14) and the loose roller (16) are received on the plate (8b) on the drive side. The two outer plates (8a, 8b) are connected together by the screws shown in FIG. 1 which engage through slotted holes in the middle plate (7).

The middle plate (7) has, in the direction of motion, on its two opposite surfaces, respectively two parallel grooves (18a, 19a, 20a, 21a) which run perpendicularly to the plane of the drawing in FIG. 2. The two outer plates (8a, 8b) respectively have, on the side facing the middle plate (7), two grooves (18b, 19b, 20b, 21b) which run parallel, have rectangular cross sections, and likewise run parallel to the V-shaped grooves (18a, 19a, 20a, 21a) of the middle plate (7), and have spacings which match the spacings of the V-shaped grooves. This double guide on both sides thus has a total of four guide ways, which are respectively formed by a V-shaped groove in the middle plate 7 and the opposed rectangular groove of the outer plate (8a, 8b). Rolling bodies in the form of rollers (18c, 19c, 20c, 21c) or balls are inserted in these guide ways. Moreover, the beveled round rods (18d, 18e, 19d, 20d, 21d, 21e) are rotatably inserted with the flat surfaces facing the rolling bodies (18c–21c). The flat surfaces of these beveled round rods form the guide ways for the rolling bodies.

Two beveled round rods are thus inserted in two mutually opposite rectangular grooves (18d, 21d), and the rollers (18c, 21c) are inserted crosswise in the remaining guide grooves. In the spaced-apart other side, respectively only one round rod (19d, 20d) is inserted in the mutually opposed rectangular grooves, and the rollers are all aligned in the same direction. This insertion of the rollers in the like direction in the one guide groove (19a, 19b) and the crosswise insertion of the rollers in the other guide groove (18a, 18b) is indicated in the enlarged view of FIG. 3 by the axes of rotation, shown dashed, of the rolling bodies.

Because the beveled round rods are rotatable in their seats formed by the corners of the rectangular grooves, wedge angles between the plates (8a and 7, or 7 and 8b) are compensated. Over-determinations, which otherwise arise with double guides on both sides, are thereby prevented. It is thus only important to ensure, in technical production, that the mutual parallelism of the grooves (18a–21a, 18b–21b) in the three plates (8a, 7, 8b). As regards the spacings of the grooves (18a–21a, 18b–21b), on the other hand, no requirements of high accuracy have to be set, since any errors are compensated by the rotation of the round rods. The matching alignment of the beveled round rods in their seats is adjusted of itself on screwing together and tightening the screws which connect the two outer plates (8a, 8b).

Such a linear guide with double guides on both sides is distinguished by high stability and rigidity, so that hardly any tilting moments arise which could be transmitted to the stage. At the same time, a high degree of smooth running is ensured, since no over determination can lead to jamming. Thus the motion of the stage (2) can take place with the high precision which is ensured by the belt drive.

The belt drive is constructed on the principle of a loose roller in the embodiment shown in the Figures. This belt drive provides a transmission ratio of 1:2 between the motion of the driven part (8b) and the peripheral motion of the driving roller (12). Alternatively, it is also possible to make use of other belt drives of the block and pulley type. For example, the shaft (17) could be rotatably mounted, the band (15) guided by means of a second roller on the moving part, and attached again at the focusing module at the height of the shaft (17). Such a block and pulley system then provides a transmission ratio of 1:4. In this case, the pinion (13) is to be made with a diameter which corresponds to one quarter of the diameter of the drive roller (12).

Furthermore, in contrast to the illustrated embodiment, it is possible to construct the grooves in the guided plate (7) of a rectangular shape, and the grooves of the guiding plates (8a, 8b) of V-shaped form.

Figure 5:
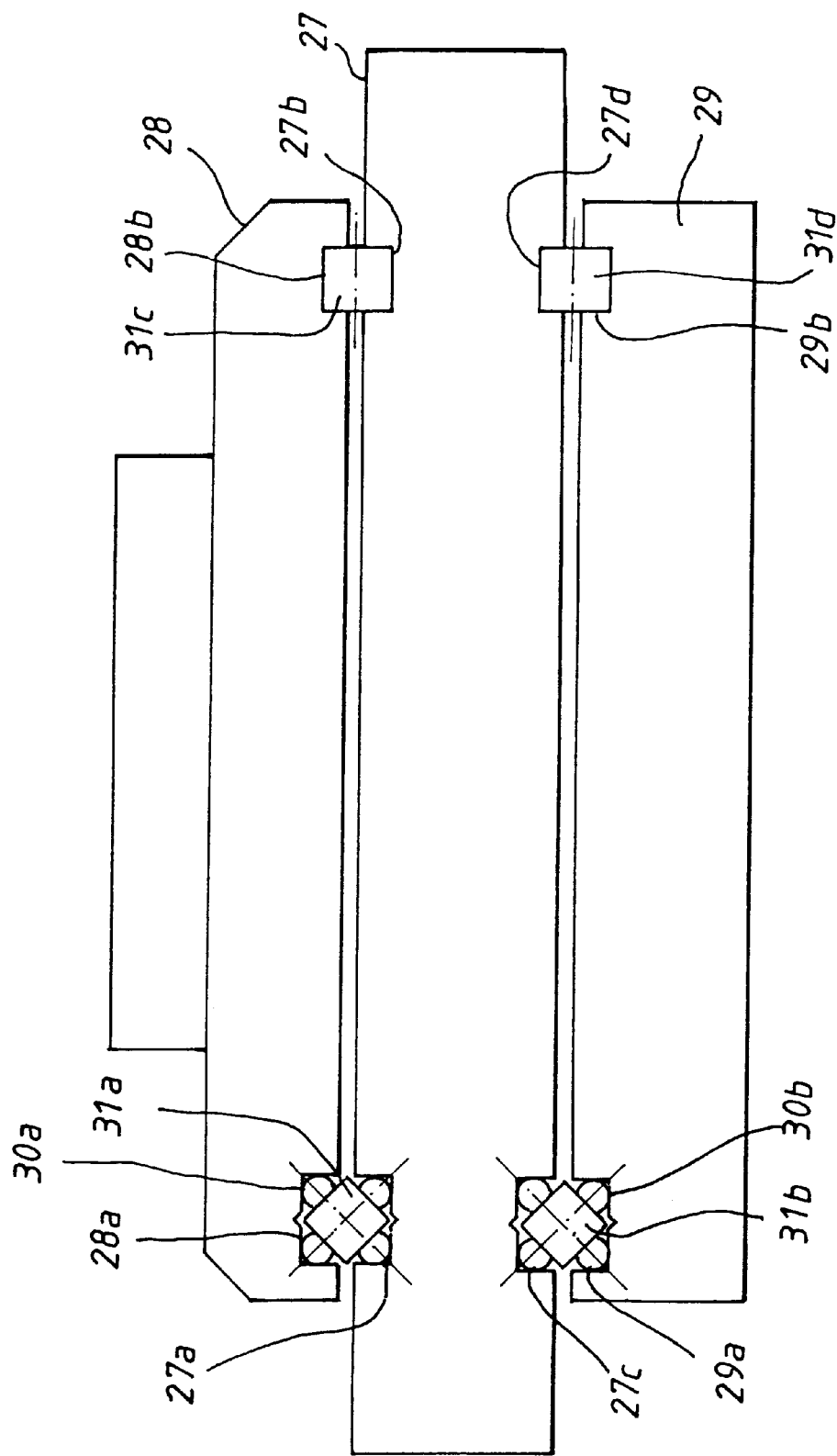
FIG. 5 shows a section through an alternative preferred embodiment of the linear guide.

In the preferred embodiment shown in FIG. 5 of an alternative double guide on both sides, both the guide grooves (28a, 28b, 29a, 29b) of the two outer portions (28, 29) and also the guide grooves (27a–d) of the middle portion are constructed with a rectangular cross section. On one side, respectively four beveled round rods (30a, 30b) are inserted in the guide grooves formed by respectively two opposed grooves (27a, 28a) and (27c, 29a) of the outer portions and of the middle portion, thus eight beveled round rods in all. Rollers (31a, 31b) are inserted crosswise in these two mutually opposed guide grooves. On the other side, in the guide grooves formed by the mutually opposed grooves (27c, 28b) and (27d, 29b), rollers (31c, 31d) are likewise inserted, but always in the same axial direction.

In this embodiment also, the round rods (30a, 30b) align themselves optimally when the guide is prestressed, that is, on screwing the two outer portions (28, 29) together. The guide thereby has a smooth running quality and stability comparable to those of the guide shown in FIGS. 2 and 3. The production cost is however reduced, since both the two outer portions (28, 29) and also the middle portion (27) can be produced as diecast parts, e.g. of aluminum, with minimum remachining of the guide grooves. In order to ensure a sufficiently hard running surface for the rollers (31c, 31d), even with aluminum as the material in the guide grooves without round rods, a respective hardened spring steel strip can be inserted in these guide grooves.

We claim:

1. A linear guide comprising at least two mutually guided parts with guide surfaces and mutually corresponding grooves, wherein a portion of said guide surfaces comprises plane surfaces of rotatable beveled round rods, located in said mutually corresponding grooves, guide grooves of one guided part are V-shaped and guide grooves of the other guided part are rectangular, and said beveled round rods are located in corners of said rectangular grooves.

2. The linear guide according to claim 1, further comprising rolling bodies located in said grooves.

3. The linear guide according to claim 2, wherein said rolling bodies comprise rollers.

4. The linear guide according to claim 1, wherein said mutually guided parts comprise a middle part and two interconnected outer parts, wherein said middle part has on mutually opposite sides respectively two guide grooves that are mutually parallel, and said outer parts respectively have, on a side facing said middle part, two parallel guide grooves having a corresponding distance to said guide grooves of said middle part.

5. The linear guide according to claim 4, wherein said guide grooves of said middle part or said outer parts have a rectangular cross section, and respectively two of said beveled round rods are located in first mutually opposed rectangular guide grooves, and respectively only one of said beveled round rods is located in second rectangular guide grooves.

6. The linear guide according to claim 5, wherein said second rectangular guide grooves are arranged on the same side in relation to said first rectangular guide grooves with respectively two beveled round rods.

7. The linear guide according to claim 4, wherein all of said guide grooves have a rectangular cross section and said beveled round rods are positioned in all corners of two mutually opposed guide grooves.

8. The linear guide according to claim 1, wherein all said guide grooves are rectangular.

9. The linear guide according to claim 4, wherein said two interconnected outer parts are screwed together with screws that pass through slotted holed in said middle part.

10. A microscope comprising a stage (2) that is movable relative to a microscope stand, wherein said stage (2) is guided on said microscope stand by means of a linear guide according to claim 9.

11. The microscope according to claim 10, comprising a drive motor (9) and a belt drive (12, 15, 16) for transmission of rotary motion of said drive motor (9) to linear motion of said stage (2).

12. The microscope according to claim 11, further comprising a mutually meshing system of a rack (14) and pinion (13) in addition to said belt drive (12, 15, 16).

13. The microscope according to claim 12, wherein said drive motor (9) comprises an electric motor (9) for driving a drive roller (12) of the belt drive (12, 15, 16), further comprising a harmonic drive gearing for coupling together said electric motor (9) and said drive roller (12).

14. A linear guide comprising at least two mutually guided parts with guide surfaces and mutually corresponding grooves, wherein a portion of said guide surfaces comprises plane surfaces of rotatable beveled round rods located in said mutually corresponding grooves, said mutually guided parts comprise a middle part and two interconnected outer parts, said middle part has on mutually opposite sides respectively two guide grooves that are mutually parallel, and said outer parts respectively have, on a side facing said middle part, two parallel guide grooves having a corresponding distance to said guide grooves of said middle part.

15. A linear guide according to claim 14, wherein said two interconnected outer parts are screwed together with screws that pass through slotted holes in said middle part.

16. The linear guide according to claim 14, wherein the guide grooves of one guided part are V-shaped and the guide grooves of the other guided part are rectangular, and said beveled round rods are located in corners of said rectangular guide grooves.

17. The linear guide according to claim 14, further comprising rolling bodies located in said grooves.

18. The linear guide according to claim 14, wherein said rolling bodies comprise rollers.

19. The linear guide according to claim 14, wherein said guide grooves of said middle part or said outer parts have a rectangular cross section, and respectively two of said beveled round rods are located in first mutually opposed rectangular guide grooves, and respectively only one of said beveled round rods is located in second rectangular guide grooves.

20. The linear guide according to claim 19, wherein said second rectangular guide grooves are arranged on the same side in relation to said first rectangular guide grooves with respectively two beveled round rods.

* * * * *